United States Patent [19]
Croswell, Jr.

[11] 3,885,758
[45] May 27, 1975

[54] AIRPLANE WING CAMBER CONTROL

[75] Inventor: Thomas L. Croswell, Jr., Vienna, Va.

[73] Assignee: Thomas L. Croswell, Jr., Baden, Pa.

[22] Filed: Aug. 22, 1973

[21] Appl. No.: 390,399

Related U.S. Application Data

[63] Continuation-in-part of Ser. No. 201,417, Nov. 23, 1971, abandoned.

[52] U.S. Cl. ................. 244/44; 244/134 D; 416/39
[51] Int. Cl. .............................................. B64c 3/44
[58] Field of Search ............ 244/44, 41, 42 R, 90 R, 244/113, 123, 43, 134 D; 114/140, 162; 416/23, 39, 132, 95, 147, 225, 240, 81

[56] References Cited
UNITED STATES PATENTS

| | | | |
|---|---|---|---|
| 3,042,371 | 7/1962 | Fanti | 244/44 |
| 3,183,975 | 5/1965 | Keen | 416/39 |

*Primary Examiner*—Trygve M. Blix
*Assistant Examiner*—Barry L. Kelmachter
*Attorney, Agent, or Firm*—Thomas E. Beall, Jr.

[57] ABSTRACT

The angular configuration of a fluid control surface, with respect to the relative direction of fluid flow, is controlled by selectively heating the structural portions of only one side of the control surface to expand the structural members on the one side with respect to the structural members on the other side for warping the control surface generally from its leading to its trailing edge. Particularly, the camber of an airplane wing is changed by this selective heating for controlling the wing portion lift. Preferably, wires extend generally from the leading edge to the trailing edge of the wing as wing structural members closely adjacent the upper and lower surfaces of the wing, with both sets of wires being prestressed to provide an intermediate camber for the wing portion when the upper and lower wires are the same temperature, a generally symmetrical wing configuration when only the lower wires are heated, and a high lift maximum camber when only the upper wires are heated. The wires may be electrically heated by the passage of current therethrough, closely adjacent the wing surface for air cooling, deeply embedded in the wing structure for insulation, or contained within concentric tubes conducting a cooling or heating fluid. Further, the wires may be organic synthetic fibers with electrically conductive material embedded in them for thermal expansion, or a composite of electrically conductive and non-electrically conductive fibers for thermal expansion, or composed of an electrostrictive material to shorten upon the passage of electrical current, or of composite structure as above mentioned, with an electrostrictive component for shortening with the passage of a current.

16 Claims, 8 Drawing Figures

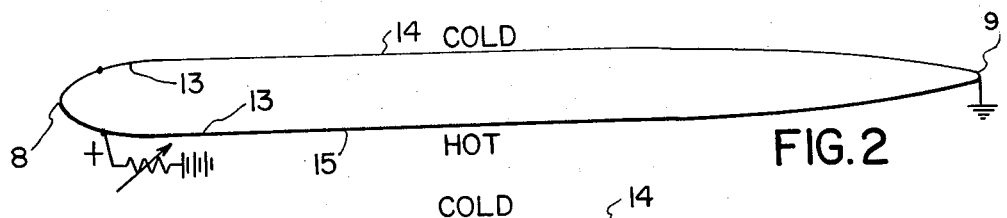
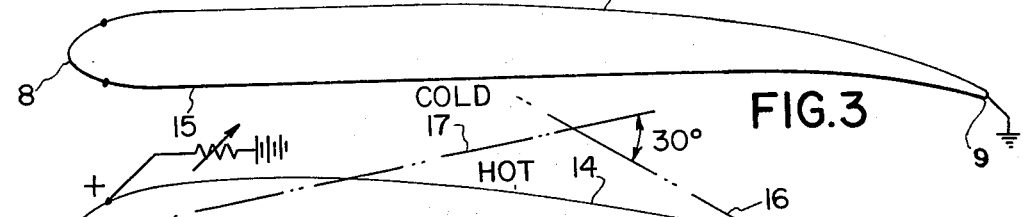
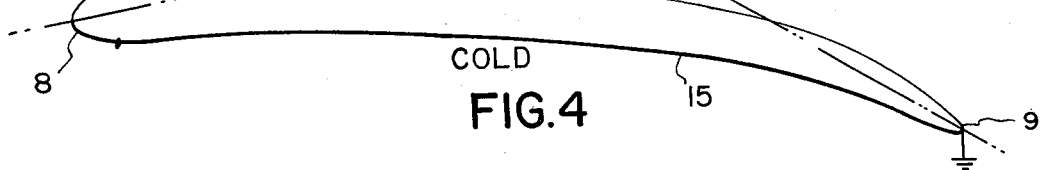
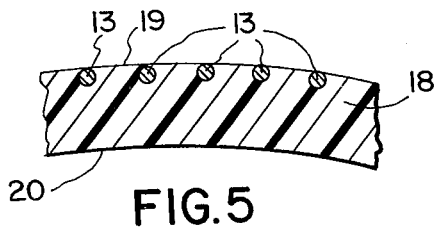
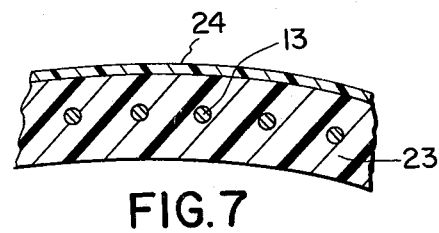
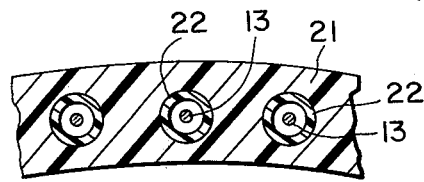
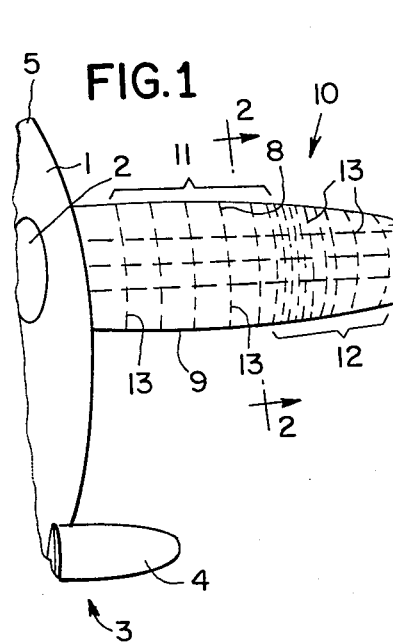
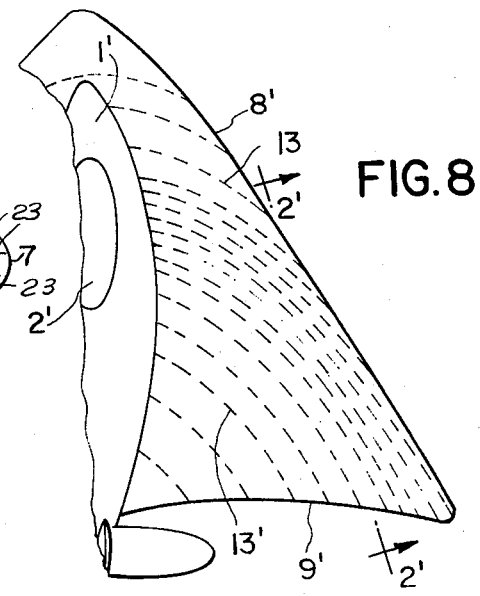

AIRPLANE WING CAMBER CONTROL

This application is a Continuation in part of copending application, Ser. No. 201,417, now abandoned filed Nov. 23, 1971, by Thomas L. Croswell, Jr., for "Airplane Wing Camber Control."

BACKGROUND OF THE INVENTION

There are many fluid control surfaces wherein the curvature of the fluid control surface is important for the function of the apparatus, for example turbine blades, turbine stators, aircraft propellers, aircraft wings for lift control, aircraft stabilizers, aircraft ailerons, and the like.

In the past, many different methods have been used to change the curvature of aircraft wings, particularly their camber for correspondingly changing their lift. Usually, different wing portions have been pivotally connected to each other and relatively moved by piston and cylinder arrangements, or mechanical linkages. The patent to Ross U.S. Pat. No. 2,979,287, Apr. 11, 1961, relates to an inflatable wing with variable camber, but the surface shape is generally changed which is undesirable in many instances because of the increased wing thickness resulting therefrom. In the patent to Cone U.S. Pat. No. 2,152,029, Mar. 28, 1939, upper and lower cables are used to change the curvature of an aircraft wing, but the wing is necessarily divided into various sections with a connection between each section and at least one of the cables, which presents a complexity and bulkiness that cannot be tolerated in modern aircraft.

With respect to aircraft propellers, it is known to change their pitch by changing their curvature, for example with the Vischer U.S. pat. No. 1,985,391, Dec. 25, 1934, which employs two pivotally connected wing portions that are relatively moved by means of a selectively heated member. Further, in general fan construction, it is known to change blade curvature according to the environment temperature by employing a bimetallic structure.

In changing the curvature of any fluid control surface, it would be most desirable to maintain a smooth configuration for laminar flow where desired. While the inflatable wing of the Ross patent provides this desired smooth surface and absence of any transition areas that might produce turbulence, the resulting thickness of the wing is generally undesirable for high speed flight, and while the blade of the Rom patent maintains a smooth configuration during its change without increasing its thickness, there is no selectivity since the curvature is controlled by the environment temperature.

SUMMARY OF THE INVENTION

It is an object of the present invention to change the curvature of a fluid control surface in a smooth manner from its leading to its trailing edge without materially changing its thickness, and providing selective control for the curvature.

Preferably, the present invention applies to the various control surfaces for aircraft, for example the stabilizers, ailerons, or lift portions of the main wings. The control surface is provided with structural wires generally extending from the leading edge to the trailing edge on both the upper and lower surfaces, or closely adjacent thereto, so that upon selectively heating either the upper or lower wires, they will expand to a greater extent than the unheated wires on the opposite surface to warp or curve the surface generally over its entire extent from its leading edge to its trailing edge. With this structure, it is seen that the upper and lower surfaces will at all times be smooth and there will be no abrupt transition portions, and the general thickness of the wing may be maintained.

It is particularly desirable, with respect to changing the camber of an aircraft wing for lift control, to provide prestressed lower wires and prestressed upper wires so that normally the wing will be curved to an intermediate position for substantial lift, so that the aircraft may land safely upon system failure. Further, this particular structure permits heating of the lower wires to straighten out the wing and generally give it a symmetrical shape for high speeds, and to allow heating of only the upper wires to give it maximum curvature for landing and take-off. Preliminary computer investigations have shown that the angle between the plane of symmetry for the leading edge and the plane of symmetry for the trailing edge may vary 30 degrees with a conventionally shaped wing structure with the features of the present invention. While the wires or cables may be heated in any desired manner, for example by providing heat exchange relationship with a hot fluid, it is most preferable to resistance heat the wires by the passage of an electric current. Such electric heating will provide a very fast response time.

In some instances, it will be desirable to provide a slow response time for the cooling of the wires, and this is structurally accomplished by insulating the wires with respect to the environment fluid. A slow response time for the heating may be easily provided by conventional means for adjusting the electric current, for example rheostats or choppers. For a quick response cooling, the wires may be placed closely adjacent the surface for exposure to the environment fluid or they may be carried within cooling fluid conducting tubes. It is particularly desirable to have a quick response time when the present invention is employed for changing the curvature of portions of the wing that are to be used as ailerons. With such a structure, the camber of the main portion of the wing may be adjusted for lift purposes or the curvature of an outer minor portion of the wing may be separately adjusted for functioning as an aileron, while structurally providing a smooth uninterrupted wing surface from base to tip and leading edge to trailing edge without any visible transition at any time.

Further, the wires may be organic synthetic fibers with electrically conductive material embedded in them for thermal expansion, or a composite of electrically conductive and non-electrically conductive fibers for thermal expansion, or composed of an electrostrictive material to shorten upon the passage of electrical current, or of composite structure as above mentioned, with an electrostrictive component for shortening with the passage of a current.

BRIEF DESCRIPTION OF THE DRAWING

Further objects, features and advantages of the present invention will become more clear from the following detailed description of the drawing, wherein:

FIG. 1 is a plan view of a conventional aircraft employing the features of the present invention in its fixed wing structure;

FIG. 2 is a partially schematic cross sectional view taken along line 2—2 of FIG. 1 showing the wing configuration during high speed flight;

FIG. 3 is a view similar to FIG. 2, but showing the wing configuration in its normal position for intermediate lift;

FIG. 4 is a view similar to FIG. 2, but showing the wing in its extreme curvature position for maximum lift;

FIG. 5 is a partial cross sectional view of the wing skin taken on plane perpendicular to the plane of FIG. 2, according to one construction;

FIG. 6 is a cross sectional view similar to FIG. 5, but of another construction;

FIG. 7 is a cross sectional view similar to FIG. 5, but of another construction; and FIG. 8 is a plan view of a delta wing aircraft employing the features of the present invention.

DETAILED DESCRIPTION OF THE DRAWING

While as set forth above, the present invention may be used with various types of fluid control surfaces, it is particularly advantageous when employed for changing the curvature of a fluid control surface for an airplane, for example the stabilizer, the main wing section for lift purposes, or a wing portion to act as an aileron. As a specific example, the invention will be set forth below with respect to the conventionally constructed airplane of FIG. 1 and particularly with respect to its main wing.

As shown in FIG. 1, the airplane includes a fuselage 1, a cockpit 2, a tail assembly 3, a stabilizer 4, a forward nose 5, and a wing 6. It is understood that in a conventional manner, the airplane is symmetrical with respect to a longitudinal vertical plane, and for that reason only one side of the airplane has been shown in detail. In a conventional manner, the wing tip is elongated from its connection with the fuselage 1 to its outer tip 7, and has considerable length from its leading edge 8 to its trailing edge 9, with respect to the direction of relative fluid motion 10. The portion of the wing 11 closest to the fuselage has its curvature or camber controlled according to the features of the present invention for changing the lift of the aircraft wing for take-off, landing and high speed flight. The portion 12 of the wing, adjacent the tip 7, has its curvature controlled according to the features of the present invention to act as an aileron.

As shown more clearly in FIGS. 2 and 5 taken with FIG. 1, there are a plurality of structural wires 13 in the upper and lower skin of the aircraft wing for both portion 11 and portion 12, which wires generally extend from the leading edge 8 to the trailing edge 9. As somewhat schematically shown in FIG. 2, the upper surface 14 has a structural wire embedded in it and the lower surface 15 has a structural wire 13 embedded in it. Preferably, the wing, as viewed in cross section, is constructed to have a nearly symmetrical shape as shown in FIG. 2 in a cruising condition. The wires 13 in the upper surface 14 and lower surface 15 are prestressed so that the cross sectional shape of the wing may be controlled by the pilot. Thus, in FIG. 3, the wing will have a slight curvature to produce sufficient lift for low speed take-off and landing flying and relatively high speed cruise in the case of power loss. When it is desired to fly the airplane at high speeds, the wires 13 in the lower surface 15 are heated to reduce drag. With this heating, the wires 13 in the lower surface 15 will expand so that the wing will assume the shape as shown in FIG. 2. When high lift is desired for landing or take-off at relatively slow speeds, the wires 13 in the upper surface 14 are heated while the wires in the lower surface remain unheated, and accordingly only the upper wires will expand to produce a greater curvature in the wing as shown in FIG. 4. Preliminary computer investigations have shown that with an otherwise conventionally shaped and dimensioned wing, the angle between the plane of symmetry 16 for the trailing edge 9 and the plane of symmetry 17 for the leading edge 8 will be approximately 30° in the position of FIG. 4, and these two planes will coincide in the symmetrical position of FIG. 2. This difference in camber will be sufficient for reducing the landing speed of an otherwise conventional aircraft.

The thermal expansion of the structural wires will depend upon their thermal coefficients of expansion as to the material selected, the temperature to which they are heated, and the other structural components of the wing. Preferably, the wing skin is constructed of the selectively heated wires 13 running from the leading edge to the trailing edge, unheated structural wires running from the fuselage to the tip 7, and a skin resin. Also, structural wires 23 may run from the fuselage to the tip 7 in a top set and a lower set generally perpendicular to the wires 13 and independently heated in sets for controlling wing twist and/or dihedral and/or sweepback. With the temperature employed, the wires may have an expansion of 1.5 percent between their cold state and heated state. Preferably, the wing would be of a hollow construction with the above-mentioned upper skin and lower skin separated by a honeycomb or foam structure or other flexible membranes.

While any type of heating may be employed, it is most desirable and convenient to provide electric resistance heating for the wires 13. Accordingly, the wires are connected at their trailing edge 9 to the ground for the electrical system and separately connected at their leading edge 8 to a controlled source of current. That is, all or groups of the upper wires 13 may be selectively connected to a source of current and all or groups of the lower wires may be selectively connected to a source of current independently of the upper wires. The wires or groups of wires are heated by thus passing either direct or alternating current therethrough from the leading to the trailing edge.

For a fairly quick response with respect to cooling the wires, which is particularly desirable with respect to the group 12 functioning as an aileron, it is desirable to have the wires closely adjacent the exposed surface of the skin. Such a structure is shown in FIG. 5. The wires 13 are embedded in a layer of resin 18 that may in fact be resin mixed with fibers, or a laminated structure. The coefficient of thermal expansion for the resin may be chosen to correspond to or in some other way desirably complement the coefficient of expansion for the wires 13. After the wires 13 in FIG. 5 have been heated by the passage of current therethrough, they are rapidly cooled by air flowing over the exposed surface 19 after the current is shut off or reduced. The opposite surface 20 of the skin is suitably laminated to a honeycomb or foam core or flexible membranes (not shown).

The skin structure of FIG. 6 may be employed when it is desired to thermally insulate the wires, heat the wires by the passage of a heat exchange fluid, or rapidly cool the wires by the passage of a heat exchange fluid.

The structure of FIG. 6 is particularly desirable for the aileron portion 12 of the wing in that the thermal response for the wires may be made very rapid. As before, the skin is constructed of a resin 21, but with FIG. 6 a plurality of tubes 22 surround the wires 13 in spaced relationship. Thus, there is produced an annular passage between the wires 13 and their tubes 22, for the reception of a heat exchange fluid to either heat or cool the wires. Most desirably, the wires are heated as before by the passage of electricity and are cooled by the passage of a cooling fluid to provide the rapid response for aileron control.

In some instances, it is desirable to have a slow cooling and a slow heating for the wires being controlled, particularly with respect to the lift portion 11 of the wing. Thus, there will be no rapid changes in lift which might produce instability in the plane. It is a quite simple matter to control the speed of heating for the wires by merely controlling the increase in current being fed to the wires by means of a rheostat or chopper. The cooling may be controlled by the above-mentioned cooling fluid in FIG. 6 exactly over a wide range, fixed for rapid cooling as in FIG. 5, or fixed for slow cooling as in FIG. 7.

As shown in FIG. 7, the skin is constructed of a resin 23, of a type as set forth above, for deeply embedding the wires 13. The resin 23 may be chosen for its heat insulating properties to provide any desired cooling. Preferably, the skin is of a laminated construction with an outer layer 24 chosen for its durability and strength without regard to its insulating properties.

The above features as set forth specifically with respect to FIGS. 2 through 7 may be equally well employed with the wing of a delta wing type aircraft as shown in FIG. 8, with the construction of FIG. 2 existing with respect to the section line 2'—2' of FIG. 8. Accordingly, all of the preceding discussion applies equally well to FIG. 8.

Further, the features as set forth with respect to FIGS. 2-7 may be applied with respect to the construction of a blade or stator for a compressor or turbine to change the output of the rotatable machine. However, the features of the present invention are particularly desirable when employed for controlling the lift or aileron surfaces of an aircraft wing.

It is contemplated that various types of electrically conductive resistance wires may be used for thermal expansion in the above disclosure, which wires may take the following forms: an electrically conductive metallic element or non-metallic element sheaved or integrally bonded to a non-electrically conductive outer tube that would be heated and thermally expand; a twisted, braided, interwoven or other filament or fiberlike materials wherein some are electrically conductive for resistance heating and others are non-electrically conductive for thermal expansion by heat transfer from the electrically conductive ones; a material composed of a normally non-conductive material with conductive material as a filler so that the composite article is electrically conductive; a composite material comprising a plurality of layers of sheet material wherein some are electrically conductive and others are not electrically conductive. In the above cases, the electrically conductive material would act as the resistance element for heating purposes and thermally expand as a structural member, and further transfer heat to the adjacent non-electrically conductive material that would also thermally expand as a structural member. Some of the non-conductive materials may be, for example, organic fibers, for example a commercially available material from DuPont Chemical Company called PRD-49 or the commercially available material Nomex, which latter material is a high temperature nylon.

Further, it has been found that various composite materials will restrict or contract when subjected to an electrical current, for example it has been found that intermixed electrically conductive graphite particles or fibers and non-conductive, for example organic, particles or fibers when subjected to an electrical current will constrict. It is thought that with graphite fibers providing resistance heating, epoxy between such fibers will by heat transfer thermally expand and pull the fibers apart to thereby shorten the graphite fibers, even though the graphite fibers themselves are not electrostrictive in nature. This is only a theory, but it is a fact that such composite materials, particularly graphite fibers embedded in epoxy resin, have a reduction in length with the application of an electric current through the graphite fibers. Further, the graphite fibers, in addition to the advantage of being light in weight, have a tensile strength that is many times that of steel.

Further, graphite fibers, as mentioned above, may be used as the electrically conductive material in the previously mentioned composite wire constructions. Graphite fibers may at the present time be commercially obtained from Hercules Powder Company.

Further, the structural elements that will expand or contract to produce curvature of the aerodynamic surface according to the foregoing embodiments may be constructed of electrostrictive material, that is a material that will exhibit a mechanical stress tending to produce deflection, expansion or contraction when subjected to electrical stress, which material may or may not be crystalline. If the material will exhibit expansion upon being electrically stressed, it may be directly substituted for the previously mentioned materials that will thermally expand with electrical resistance heating, with such materials preferably being prestressed so that they will relax upon expansion and produce the curvature. Further, when the electrostrictive material contracts upon being electrically stressed, it may be prestressed or not when applied as a structural member of the aerodynamic surface, and its constriction will accordingly warp the surface in the preceding embodiments.

While crystalline barium titanate ceramic is a well known electrostrictive material, there are many other electrostrictive materials that would be particularly adapted for use in the present situation. Particularly, polycrystalline lead zirconate titanate ceramic is an electrostrictive material having suitable properties for application to the present invention, because it has the property of expanding and contracting in length when a voltage is applied in the direction of polarization. A positive portion of a square wave drive pulse will energize this specific material so that it will expand, while the negative portion of a square wave drive pulse will cause the material to contract. Therefore, a square wave drive pulse may be used so that its positive portion or only its negative portion may be selectively applied to the electrostrictive material for selective expansion or contraction. Such material could be used as a non-stressed structural element with contraction causing warping, or it could be used as a prestressed structural element so that with a positive voltage its expansion would cause warping in one direction and with negative voltage, its restriction would cause warping in the opposite direction. This latter specific material with the application of 30–50 volts per 0.001 inch of thickness will have a total displacement of approximately 0.001 inch per inch of length.

In the above variation of the present invention that employs an electrostrictive material, such electrostrictive material may be replaced by a magnetostrictive material, which is defined as a material having the property of changing in physical size or shape under the influence of a magnetic field. There are many known types of such magnetostrictive materials, which may be employed in the present invention as structural members having adjacent means for producing a variable magnetic field, for example a specific form may be a magnetostrictive sheet laminated with a printed circuit forming coils to produce a magnetic field varying according to the electrical drive variation. Such structural magnetostrictive material would contract or expand selectively to correspondingly warp the aerodynamic surface in one or the other direction, and prestressing may or may not be applied.

While the most preferred forms of the present invention have been set forth in detail above and these details are highly desirable in their own right, further variations, modifications and embodiments are contemplated according to the broader aspects of the present invention as defined by the spirit and scope of the following claims.

What is claimed is:

1. An airplane, comprising: a fuselage; a fluid flow affecting generally planar member extending from said fuselage and having opposed aerodynamic surfaces defining generally a leading edge and a trailing edge; a first set of generally parallel structural pretensioned wires closely adjacent one of said aerodynamic surfaces and a second set of structural pretensioned wires that is in structural opposition to said first set; and means for selectively heating only said first set of structural pretensioned wires for thermally expanding said first set of structural pretensioned wires to a substantial extent to warp said planar member in one direction and substantially affect its aerodynamic characteristics for the inflight control of the airplane.

2. The airplane of claim 1, including means for separately heating only said second set of structural pretensioned wires without heating said first set of structural pretensioned wires to thermally expand said second set of structural pretensioned wires and warp the planar member in the opposite direction from said one direction.

3. The airplane of claim 2, wherein one of said sets of structural pretensioned wires is normally pretensioned in its unheated state to a greater extent than the other of said set of structural pretensioned wires.

4. The airplane of claim 2, wherein said planar member is a wing of the aircraft; including a third set of generally parallel structural pretensioned wires closely adjacent the one of said aerodynamic surfaces and being generally perpendicular to the wires of said first set, a fourth set of generally parallel structural pretensioned wires closely adjacent the other of said aerodynamic surfaces and being generally perpendicular to the wires of said second set, and means for separately heating said third and fourth sets for selective control of surface contour perpendicular to the control of said first and second sets of wires; and including a second opposed aircraft wing a mirror image of said first mentioned wing.

5. The airplane of claim 4, wherein each of said wing first sets of wires extend generally from the respective leading edge to the respective trailing edge for a major portion of its associated wing to control the wing camber and thus control the airplane lift; each of said wings having a separate set of generally parallel structural pretensioned wires closely adjacent at least one of their aerodynamic surfaces outwardly from said first set; and means for selectively and independently heating said separate sets of structural pretensioned wires to warp their associated wing portions to function as ailerons.

6. The airplane of claim 1, wherein said planar member has outer continuous resinous skins forming said aerodynamic surfaces; and said wires are embedded within their respective one of said resinous skins for a major portion of the extent of said one aerodynamic surface.

7. A fluid flow controlling member having opposed fluid contacting surfaces defining a leading edge and a trailing edge with respect to the relative fluid flow; a plurality of generally parallel pretensioned wires generally extending in the direction from said leading edge to said trailing edge closely adjacent at least one of said surfaces and said pretensioned wires maintain said surfaces in a predetermined shape; and means selectively heating only the wires in said one surface for thermally expanding said pretensioned wires to expand said member in the direction of fluid flow on the side having said one surface to a greater extent than the other side having the other surface to generally warp said member from its leading edge to its trailing edge in a smooth manner.

8. The control member of claim 7, wherein said pretensioned wires are electrically conductive wires generally insulated from each other and said means for heating includes means for passing electric current through said wires.

9. The device of claim 8, including a second set of generally parallel pretensioned wires closely adjacent the other of said surfaces and electrically insulated from said first mentioned pretensioned wires at one of their ends; said means for heating including means for supplying an electric current to the second set of pretensioned wires independently of said first mentioned pretensioned wires in one mode of operation and supplying an electric current to the first mentioned pretensioned wires independently of said second set of pretensioned wires in another mode of operation.

10. The device of claim 7, including a separate tubular member surrounding each of said pretensioned wires for substantially its entire extent; and means for passing a heat exchange fluid through said tubes in contact with said pretensioned wires.

11. The device of claim 7, wherein said pretensioned wires extend for substantially the full extent of said controlling member in the direction of fluid flow from its leading edge continuously to its trailing edge.

12. A method for controlling the curvature of a fluid flow control member having a leading edge generally transverse to the fluid flow, a trailing edge generally transverse to the fluid flow, opposed surfaces over which the fluid flows, and opposed structural generally parallel wires extending in the direction of fluid flow and respectively adjacent each surface, comprising: selectively heating only the structural wires adjacent one surface for a portion of said member to expand the heated structural wires on the one side to at least an extent greater than the structural wires adjacent the other surface to curve the member in cross section generally from said leading edge to said trailing edge.

13. The method of claim 12, including the step of at other times selectively heating only the structural wires adjacent said other surface to expand the other structural wires on the other side and reversely curve said member in cross section generally from said leading edge to said trailing edge, with the member assuming a curvature midway between the curvatures provided by said first two steps when the structural wires are not heated.

14. The method of claim 13, wherein each of said steps of heating heat the structural wires sufficiently to change the angle between the plane of symmetry for the leading edge and the plane of symmetry for the trailing edge for the portion being selectively heated more than 5° between the first step and the second step.

15. The method of claim 12, wherein said elongated member is the wing of an aircraft; and said step of selective heating is carried out during flight of the aircraft to vary the camber of the wing and correspondingly change the lift for the airplane.

16. The method of claim 12, wherein said step of heating includes passing an electrical current through the structural wires to be heated.

* * * * *